Nov. 1, 1938.  S. C. WINGER  2,134,807
SPATULA
Filed July 7, 1936
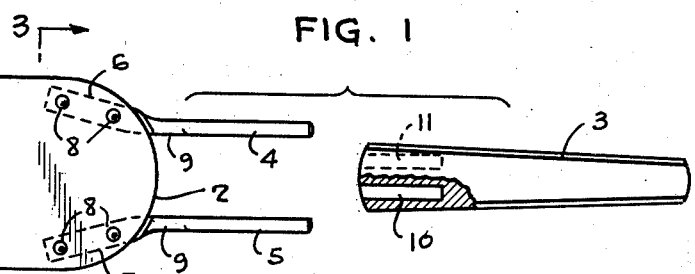
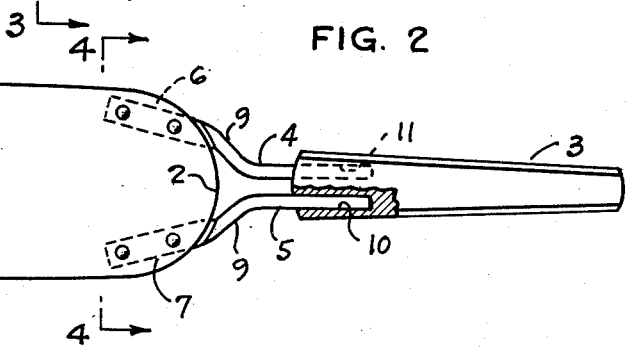
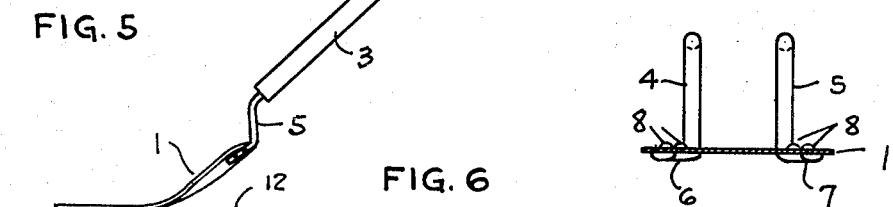
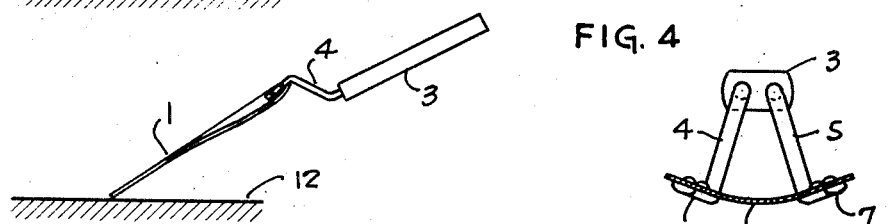
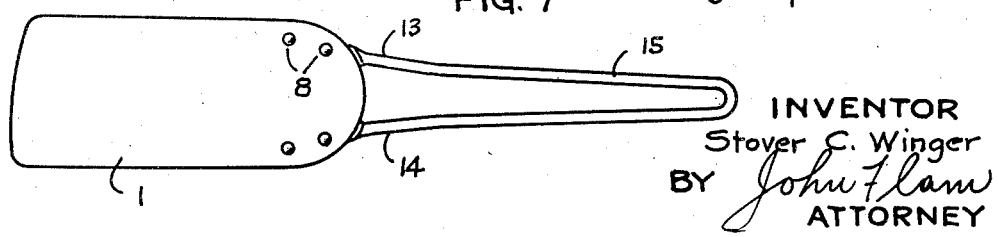
INVENTOR
Stover C. Winger
BY John Flam
ATTORNEY Patented Nov. 1, 1938

2,134,807

UNITED STATES PATENT OFFICE 2,134,807

SPATULA

Stover C. Winger, Los Angeles, Calif., assignor to Guy H. Hall, Los Angeles, Calif.

Application July 7, 1936, Serial No. 89,329

4 Claims. (Cl. 294—7)

This invention relates to a spatula or kitchen utensil, of the character described and claimed in Patent No. 2,064,136.

In general, the spatula is made so that it exhibits a discrimination to the resistance to flexure, with respect to the direction in which the flexing force is exerted. Thus for inserting the spatula for lifting an article such as a roast or a piece of cake, no difficulty is experienced in bending the blade of the spatula so that it may enter between the article and the pan in which it is located. On the other hand, when the article is lifted on the blade, the weight of the article may be quite considerable before any reverse flexure of the blade can be obtained.

Similarly, the end of the spatula may be used as for scraping, and it will remain stiff and unflexed unless an excessive force be exerted.

These effects are obtained by making the blade from thin spring material, such as spring steel, and so forming it as to be arched along a longitudinal axis.

It is one of the objects of this invention to improve in general, a utensil of this character.

It is another object of this invention to provide a simple and effective fastening means between the handle and the blade of the spatula.

It is still another object of this invention to make it possible for the handle construction to constrain the handle end of the blade in the desired arched position.

This invention possesses many other advantages, and has other objects which may be made more easily apparent from a consideration of several embodiments of the invention. For this purpose there are shown a few forms in the drawing accompanying and forming part of the present specification. These forms will now be described in detail, illustrating the general principles of the invention; but it is to be understood that this detailed description is not to be taken in a limiting sense, since the scope of this invention is best defined by the appended claims.

Referring to the drawing:

Figure 1 is a top plan view of one form of the spatula, showing the handle in removed position;

Fig. 2 is a view similar to Fig. 1, but with the handle in place;

Fig. 3 is a sectional view taken along the plane 3—3 of Fig. 1;

Fig. 4 is a sectional view taken along the plane 4—4 of Fig. 2;

Fig. 5 is a side elevation of the spatula showing it in flexed condition;

Fig. 6 is a view similar to Fig. 5, but showing the spatula used as a scraper or the like; and Fig. 7 is a top plan view of a modified form of the spatula.

The blade 1 of the spatula is made, as heretofore stated, from resilient metal such as spring steel or clock spring steel. It preferably has a rounded end 2 adjacent the handle structure. Its free end is also preferably rounded but on a much larger radius.

As described in the patent hereinabove identified, the spatula blade 1 in its completed form is so made that it has an arcuate section along the longitudinal axis, the degree of curvature decreasing from a maximum adjacent its handle, to an almost flat condition adjacent the free end of the blade.

In order to provide this contour as well as to attach blade 1 to a handle member 3, use is made of a pair of tangs 4 and 5. These tangs are each provided with flattened portions, such as 6 and 7, arranged adjacent the side edges of the blade 1 and on the bottom thereof, and provided with fastening means, such as the rivets 8, for holding the tangs 4 and 5 securely to the blade 1.

In the form shown in Figs. 1 to 6, inclusive, the tangs 4 and 5 are bent at an intermediate point 9 and they have straight parallel extensions. These tangs 4 and 5 are riveted to the blade 1, while the blade is in its flat condition as illustrated in Figs. 1 and 3. The handle member 3, which may be made of any desired material, such as metal or a phenolic condensation product or the like, is provided with longitudinal recesses 10 and 11 for the reception of the extensions of tangs 4 and 5. These recesses 10 and 11 lie parallel and close to each other. In this way in order that these recesses may engage the extensions of the tangs, these tangs 4 and 5 must be brought together to the position shown in Fig. 2, and when so brought together, they may be telescoped or inserted into the corresponding recesses 10 and 11.

The effect of this cramping together of the tangs 4 and 5 is to arch the blade 1 adjacent the handle end. This arched condition is shown in Fig. 4. The blade 1 is thus constrained to the arched position by the cooperation of the tangs 4 and 5 with the recesses 10 and 11. Since the blade 1 is urged by its resilience toward the flat condition of Fig. 3, there is a continuous frictional force between the handle 3 and the tangs. This may be sufficient without further means to keep the tangs securely in place. If desired, however, any suitable form of lock may also be applied between the tangs 4 and 5 and the handle 3.

Due to the arcuate form of the blade 1 in which it is constrained by the tangs 4 and 5, the spatula exhibits the discriminatory properties before discussed. When it is desired to slip the blade underneath an article to be lifted, the convex side of the blade 1 may be urged downwardly against the bottom of the pan 12 or the like. The blade 1 will flex about a transverse axis, and will be flattened between its free end and the point of flexure. In this condition it may be readily inserted underneath the article to be lifted.

However, if it is desired to scrape the surface 12, the spatula may be inverted as shown in Fig. 6. In this position a considerable force may be exerted downwardly without flexing the blade 1. Relatively heavy articles, such as roasts, may be supported on top of the blade 1 when it is in the position of Fig. 5.

It is not necessary that the handle 3 be formed as a separate part of tangs 4 and 5. In the form shown in Fig. 7, the tangs 13 and 14 are made from a continuous bar or wire formed to define a loop handle 15. In this form of the device, the handle 15 is first formed and the blade 1 and the handle 15 are held together by any appropriate clamping means during the riveting operation. As before, the tangs 13 and 14 constrain the blade 1 in an arcuate form.

What is claimed is:

1. In a device of the character described, a blade made from thin resilient material, and a handle structure attached to the blade adjacent one end thereof, comprising, a pair of tangs respectively adjacent opposite edges of the blade and fastened thereto, and means to so maintain the ends of the tangs as to constrain the blade at the handle end in an arched position.

2. In a device of the character described, a blade made from thin resilient material, and a structure attached to the blade, comprising a pair of tangs respectively adjacent opposite edges of the blade and fastened thereto, and a handle receiving the tangs, said handle retaining the ends of the tangs in closer relation than their free positon, to cause the tangs to constrain the blade at the handle end in an arched position.

3. In a device of the character described, a blade made from thin resilient material, and a structure attached to the blade, comprising a pair of tangs respectively adjacent opposite edges of the blade and fastened thereto, said tangs having substantially parallel extensions, and a handle having longitudinal recesses respectively to receive the extensions and to hold the extensions nearer together than their free positions, whereby the blade is constrained in an arched position at the handle end.

4. In combination, a blade made from thin resilient material, and means for constraining one end of the blade transversely arched, comprising a pair of tangs respectively adjacent opposite side edges of the blade, and means for maintaining the tangs in closer relation to each other than their free position when the blade is unconstrained.

STOVER C. WINGER.